United States Patent

Ballas et al.

[15] 3,683,416

[45] Aug. 8, 1972

[54] PROCESS FOR GENERATING REPRESENTATIONS OF PACKAGES OF LOGIC ELEMENTS UTILIZING A DATA PROCESSING MACHINE

[72] Inventors: Joseph A. Ballas, Dallas; Robert A. Penick, Richardson, both of Tex.

[73] Assignee: Texas Instruments Incorporated, Dallas, Tex.

[22] Filed: Jan. 8, 1970

[21] Appl. No.: 1,447

[52] U.S. Cl. .......................................................444/1
[51] Int. Cl ..........................................G05b 19/00
[58] Field of Search .......340/172.5; 29/624; 317/101

[56] References Cited

UNITED STATES PATENTS

| | | | |
|---|---|---|---|
| 3,534,338 | 10/1970 | Christensen et al. | ...340/172.5 |
| 3,534,396 | 10/1970 | Hart et al. | ...........340/172.5 X |
| 3,567,914 | 3/1971 | Neese et al. | ........340/172.5 X |

OTHER PUBLICATIONS

Hays, Gwendolyn G; " Computer–Aided Design: Simulation of Digital Design Logic." In IEEE Transactions on Computers, Vol. C– 18, No. 1, Jan. 1969; pp. 1– 10.

Dietmeyer, Donald L. and Su, Yueh–Hsung; " Logic Design Automation of Fan–In Limited Nand Networks." In IEEE Transactions on Computers, Vol. C–18, No. 1, Jan. 1969; pp. 11– 22.

Heath, F. G.; " Large–Scale Integration in Electronics" In Scientific American, Vol. 222, No. 2, Feb. 1970; pp. 30, 31.

*Primary Examiner*—Paul J. Henon
*Assistant Examiner*—Melvin B. Chapnick
*Attorney*—James O. Dixon, Andrew M. Hassell, Melvin Sharp, Harold Levine, John E. Vandigriff, Henry T. Olsen, Michael A. Sileo, Jr. and Gary C. Honeycutt

[57] ABSTRACT

Artwork for a logic circuit to be fabricated by printed circuit board techniques is produced by a data processing machine programmed to run a packaging routine, a placement routine, and a routing routine, in addition to check routines. All logic elements for a particular circuit are coded and identified prior to carrying out any of the machine run routines. This circuit diagram information, along with mechanical criteria of the printed circuit board on which the circuit is to be fabricated, are supplied as input data to the data processing machine. The data processing machine first takes the coded circuit diagram information and checks it for errors. It then packages the individual logic elements into multi-element units (integrated circuits). Upon completion of the packaging routine, the data processor places the multi-element units within the limits of the mechanical criteria supplied as input data. After the packaging and placing routines have been completed, the machine routes interconnections between the terminal pins of the multi-element units using a numbered ordered maze restrained to proceed within pre-established limits.

26 Claims, 16 Drawing Figures

United States Patent [15] 3,683,416
Ballas et al. [45] Aug. 8, 1972
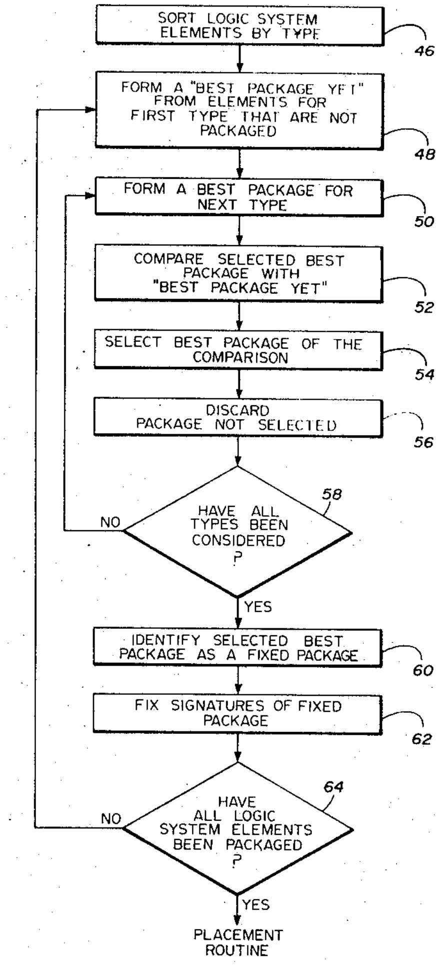

INVENTORS:
JOSEPH A. BALLAS
ROBERT A. PENICK

INVENTORS:
JOSEPH A. BALLAS
ROBERT A. PENICK

INVENTORS:
JOSEPH A. BALLAS
ROBERT A. PENICK

INVENTORS:
JOSEPH A. BALLAS
ROBERT A. PENICK

INVENTORS:
JOSEPH A. BALLAS
ROBERT A. PENICK

INVENTORS:
JOSEPH A. BALLAS
ROBERT A. PENICK

INVENTORS:
JOSEPH A. BALLAS
ROBERT A. PENICK

INVENTORS:
JOSEPH A. BALLAS
ROBERT A. PENICK

PROCESS FOR GENERATING REPRESENTATIONS OF PACKAGES OF LOGIC ELEMENTS UTILIZING A DATA PROCESSING MACHINE

This invention relates to a circuit layout technique, and more particularly to a process for producing artwork for a logic circuit to be fabricated by printed circuit techniques.

Heretofore, the artwork for most logic circuits that were fabricated on a printed circuit board was drawn by hand using "cut and dry" procedures. So long as the logic system was of a simple design, manual layout techniques produced accurate artwork for use in the manufacture of the printed circuit board. With the increased complexity of logic systems, the artwork produced by hand contained an unacceptable number of errors. Further, as the logic circuitry became more complex, the time required for the hand layout increased to a prohibitive level.

It was early recognized that data processing machines (computers) could be used to layout and produce the artwork for logic circuits. Many processes have been developed for use with data processing machines to assist in laying out and producing the artwork for a logic circuit. Most of these processes have been directed to routing techniques performed by a data processor to interconnect the various logic elements or packages of elements that have been previously assigned a given location.

An object of this invention is to provide a process for producing circuit artwork by means of a data processing machine. Another object of this invention is to produce circuit artwork by a data processing machine that runs a check routine on the input data. Yet another object of this invention is to produce circuit artwork by a data processing machine that assigns individual circuit elements to multi-element packages. A further object of this invention is to provide a process for producing circuit artwork with a data processing machine that assigns multi-element packages within limits of mechanical criteria. Yet another object of this invention is to provide a process for producing circuit artwork using a data processing machine to route interconnections between various terminal pins of multi-element units previously located. Yet another object of this invention is to produce circuit artwork by a data processing machine that runs a check routine on the routed interconnections. A still further object of this invention is to provide a process for producing circuit artwork using a data processing machine that assigns individual circuit elements to a multi-element package by repetitive steps that select the best multi-element package. Still another object of this invention is to provide a process for producing circuit artwork using a data processing machine that places a multi-element package within circuit criteria on the basis of a calculated score. An additional object of this invention is to provide a process for producing circuit artwork using a data processing machine that routes interconnections between elements by a numbered ordered maze constrained to run within preestablished limits.

In accordance with one process for producing circuit artwork, artwork for a logic system is produced by initially packaging individual circuit elements by a routine that selects the best multi-element unit yet by a first comparison of one multi-element unit with a multi-element unit formed from elements of another type. After all the multi-element units have been considered in a first pass, the best unit is then considered a fixed package and additional passes are made to select the best multi-element unit by an additional series of comparisons. After each selection of a best multi-element unit for a given comparison, the remaining multi-element unit formed for that comparison is cancelled and a new multi-element unit of that type will be formed in the subsequent pass. After completing the packaging routine, the multi-element units are located on a printed circuit board within limits of mechanical criteria supplied as input data to the processing machine. After packaging and placing the circuit elements, routing interconnections are generated between terminal pins of the individual elements using a numbered ordered maze. To complete the process of defining interconnections between the elements, the routing information is conveyed to a plotter that generates the artwork for a desired logic system.

In accordance with another process for producing circuit artwork, coded information of a logic system including mechanical criteria is input data to a data processing machine. First, the data processor generates representations of multi-element packages containing the individual elements of the logic system. After completion of the packaging routine, the multi-element packages are located on a printed circuit board within limits of the mechanical criteria supplied to the machine. To locate the multi-element packages formed by the packaging routine, the data processor computes a "score" for each multi-element unit to be located. Starting with the best score, the packages are located in the best legitimate position available for that unit. The remaining units are then considered after recomputing a score for the effected units, starting with the best remaining score, and the unit with the highest score is placed in a best legitimate position. This process is repeated until all packages have been placed. After placing all the multi-element packages on a score basis, the entire logic system is reinvestigated to determine if an improvement of the initial placement is possible. Upon completion of the placement routine, the data processor interconnects terminal pins of the individual circuit elements using a numbered ordered maze. Finally, the routing information is conveyed to a plotter that generates artwork for the logic system coded into the data processor.

In accordance with still another process for producing circuit artwork, circuit artwork for a logic system is generated using a plotter connected to the output of a data processor. Input information to the data processor includes identifying codes for each of the logic circuit elements, the element terminal pins, signature identification and mechanical criteria. First, the individual circuit elements are packaged into multi-element units on the basis of the circuit identification codes, terminal pin codes, and signature codes. These multi-element units are then located on a printed circuit board within mechanical criteria supplied as input data to the data processor. After packaging and placing the logic elements, interconnections between terminal pins of the various elements are established using a numbered ordered maze restrained to proceed within preestablished limits. Input information to the routing routine includes signal set groups which consist of pin identification (including X and Y coordinates) along with "from-to" information. Starting at the first pin location in a pin listing, a numbered ordered maze is constructed within pre-established limits until it reaches a destination point. Upon reaching a destination point, a backtrack routine is called which establishes the shortest path within the maze back to the start point. The routing routine of the present invention includes three passes for interconnecting the various element terminal pins. Each pass restricts the maze progression to certain predefined limits. Upon completion of one run of the routine, the interconnections not completed on the first run may be attempted by running the routing routine again, each time changing the bounding criteria. After all the interconnections have been completed, a plotter is supplied the coded information produced by the data processing machine to generate artwork for the logic system of interest.

In accordance with yet another process for producing circuit artwork, a data processing machine supplies input information to a plotter that produces the circuit artwork. Input information to the data processor includes coded information defining the logic circuit. This coded information includes logic element coding, terminal pin coding, signature identification and mechanical criteria. Initially, the data processor calls a check routine that checks the coded input information to determine if errors exist in the logic diagram. For example, the input of a logic element may not be connected to a source, or a source may be connected to more elements than it is capable of driving without overloading. After checking to insure that the coded logic information contains no errors, a routine run by the data processor packages the logic elements into multi-element units. These multi-element units are located on a printed circuit board constrained by mechanical input criteria by a package placing routine. Next, a routing routine establishes coded data for interconnecting paths between terminal pins of the logic elements using a numbered ordered maze. The routing routine may be run as many times as desired in an attempt to complete all interconnections. Upon completion of the routing routine, the coded data representing the interconnecting paths is checked for completeness. Upon completion of the routing check, the coded routing data is conveyed to a plotter that produces artwork for a logic system.

A more complete understanding of the invention and its advantages will be apparent from the specification and claims and from the accompanying drawings illustrative of the invention. Certain portions of the method herein disclosed are not of our invention, but are the inventions of: Joseph A. Ballas and Robert A. Penick as defined by the claims of their application, Ser. No. 001,366, filed Jan. 8, 1970, now U.S. Pat. No. 3,653,072; Mark F. Eskew and Beverly F. Hyde as defined by the claims of their application, Ser. No. 001,525, filed Jan. 8, 1970; and John W. Hill and Charles L. Satterwhite as defined by the claims of their application, Ser. No. 001,346, filed Jan. 8, 1970, now U.S. Pat. No. 3,653,071 all such applications being assigned to the assignee of the present application.

Referring to the drawings.

Figure 1:
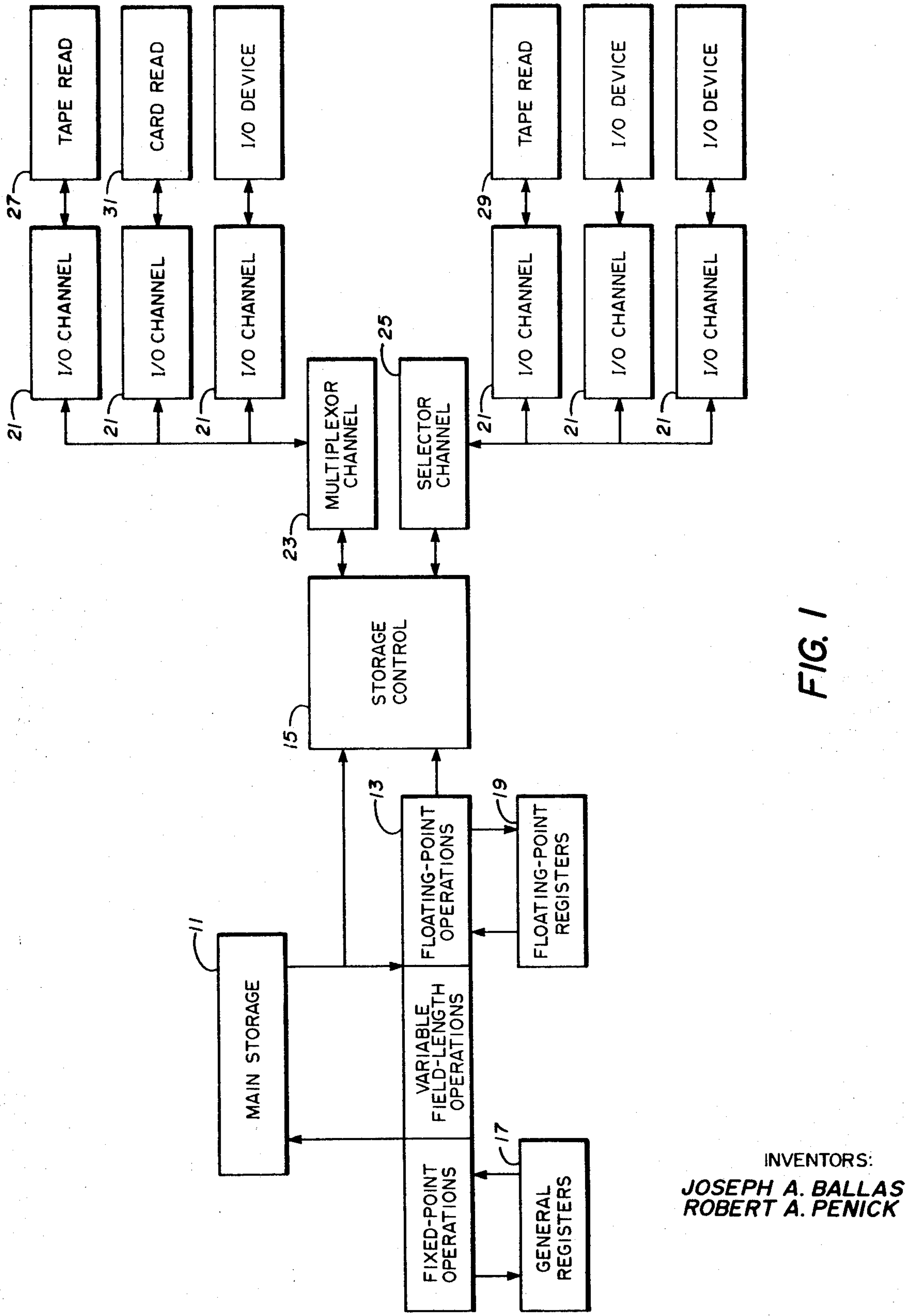
FIG. 1 is a block diagram of a data processing machine for generating instructions for the production of circuit artwork.
Figure 2:
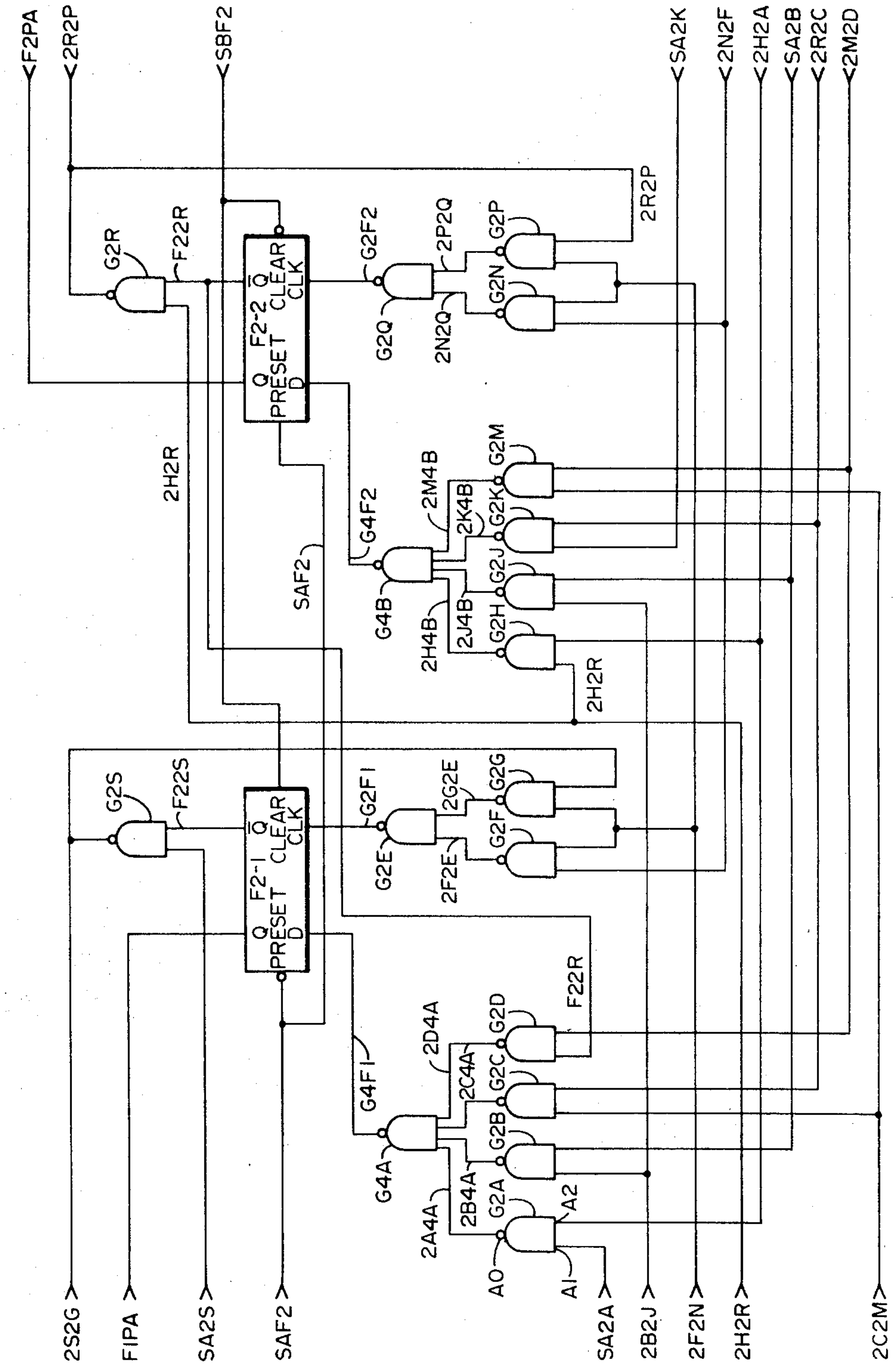
FIG. 2 is a schematic diagram of a logic system including coding information to be read into the data processing machine of FIG. 1 for generating artwork for a printed circuit board.
Figure 3:
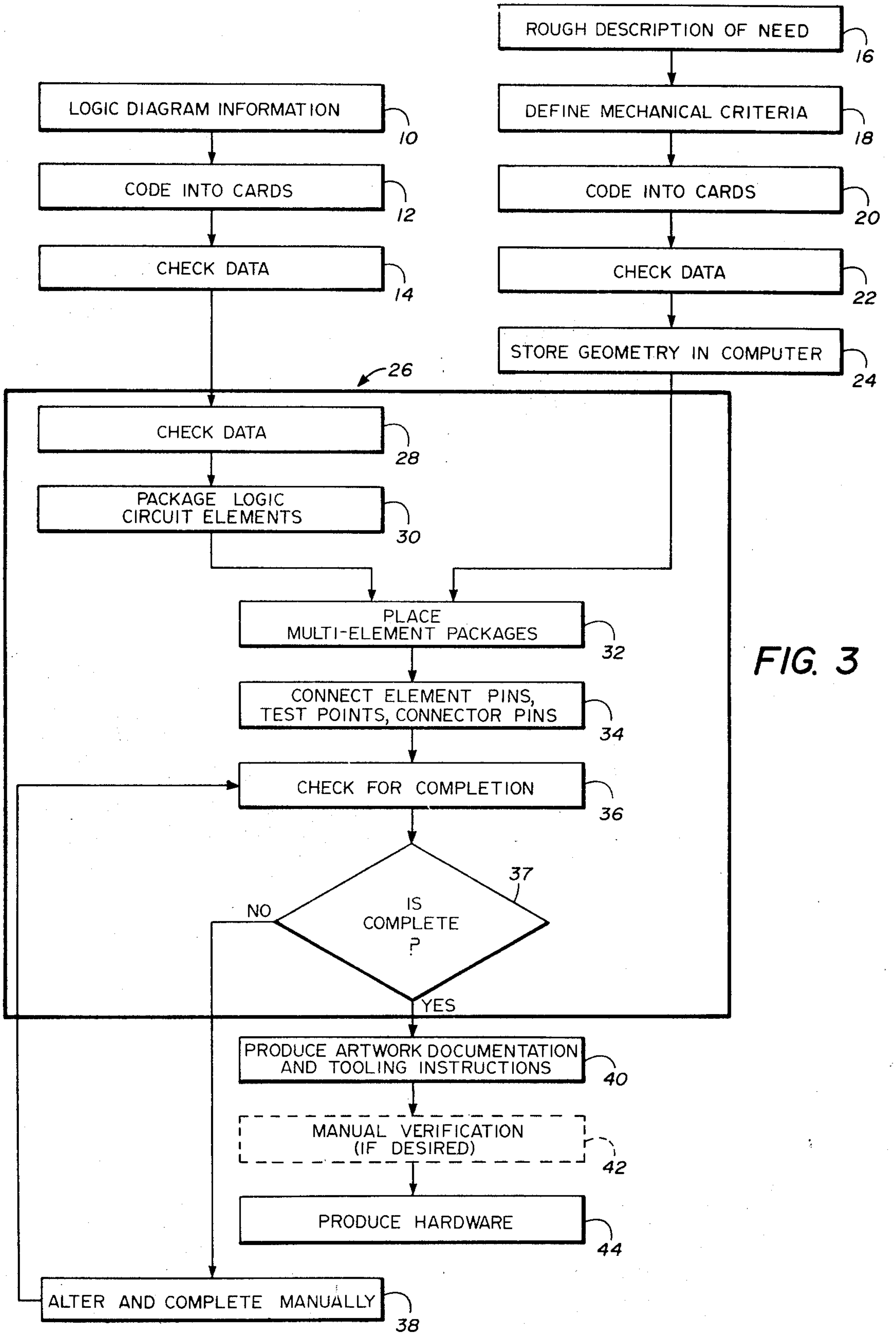
FIG. 3 is a flow chart of a process for producing artwork for a logic system of the type illustrated in FIG. 2.
Figure 4:
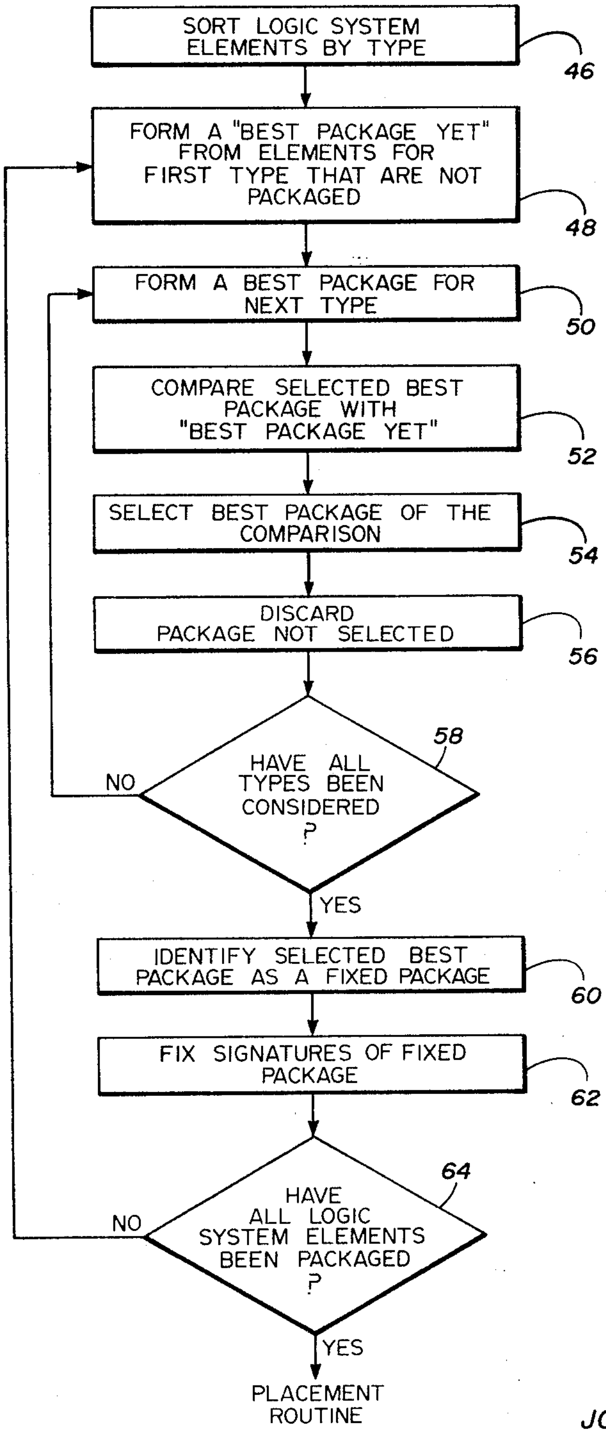
FIG. 4 is a flow chart of a routine run by a data processing machine for packaging circuit elements into multi-element packages.
Figure 5:
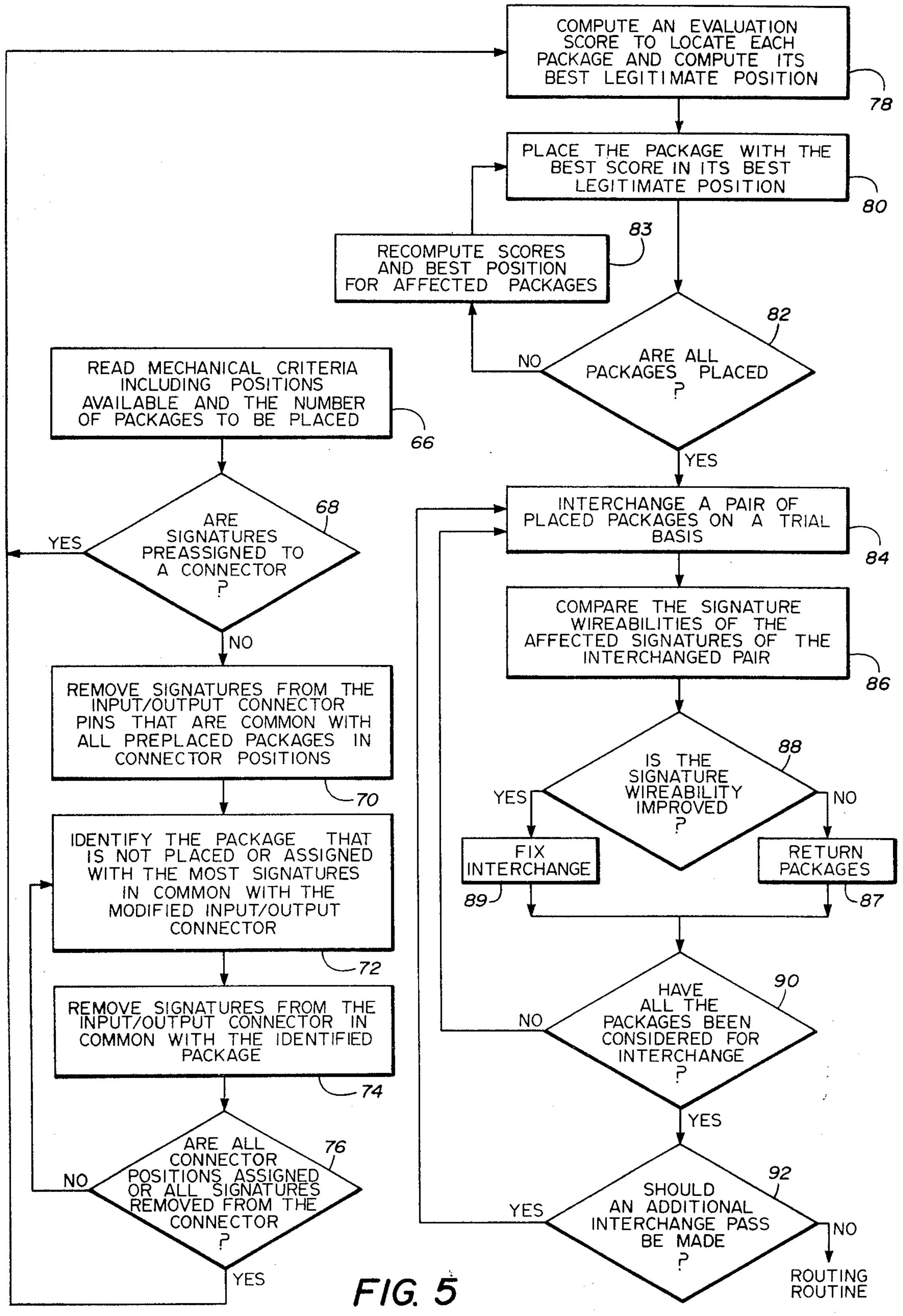
FIG. 5 is a flow chart of a routine run by a data processing machine for placing multi-element packages on a printed circuit board within mechanical criteria.
Figure 6:
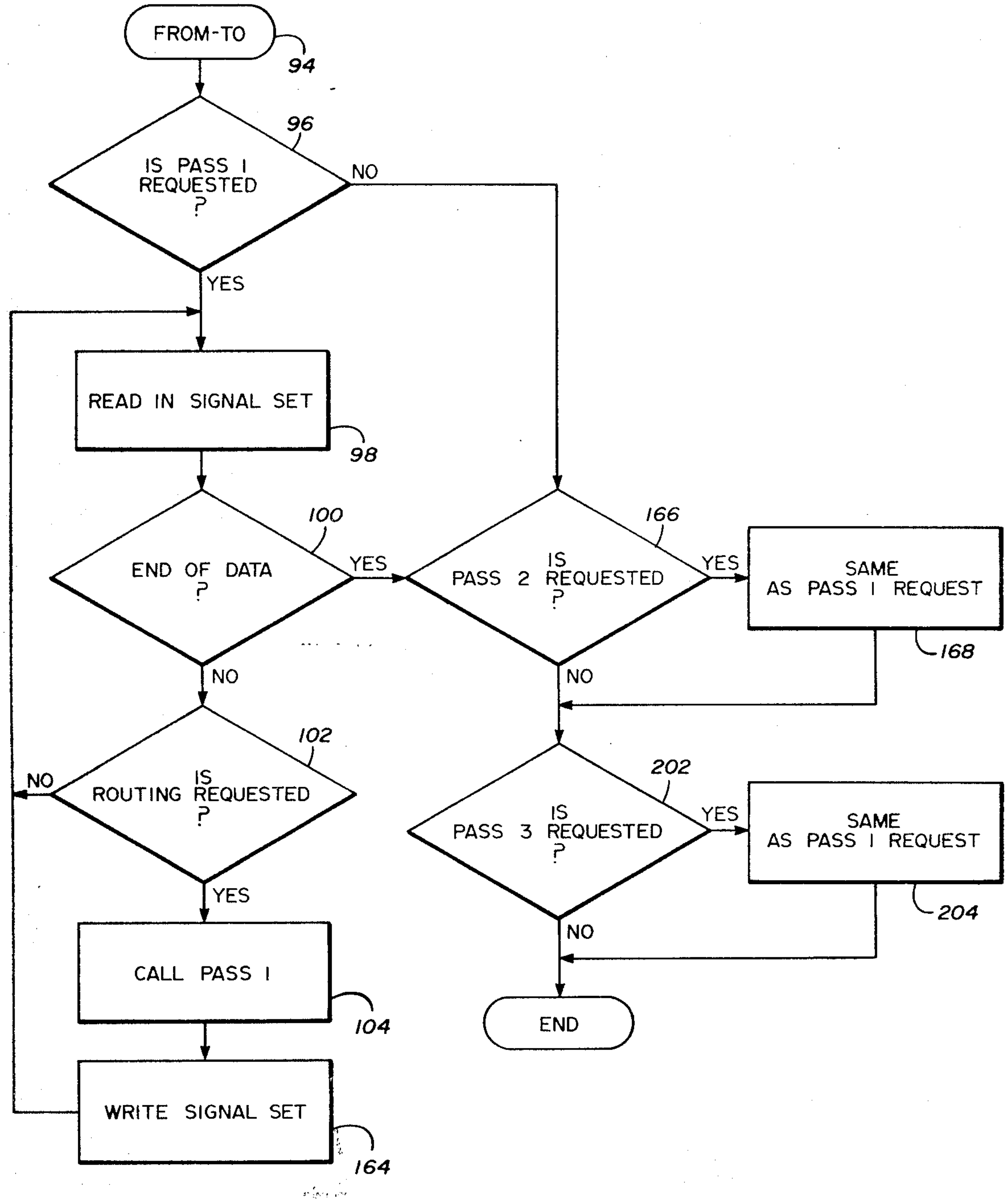
FIG. 6 is a flow chart of the routing routine run by a data processing machine for interconnecting element pins on a printed circuit board.
Figure 7:
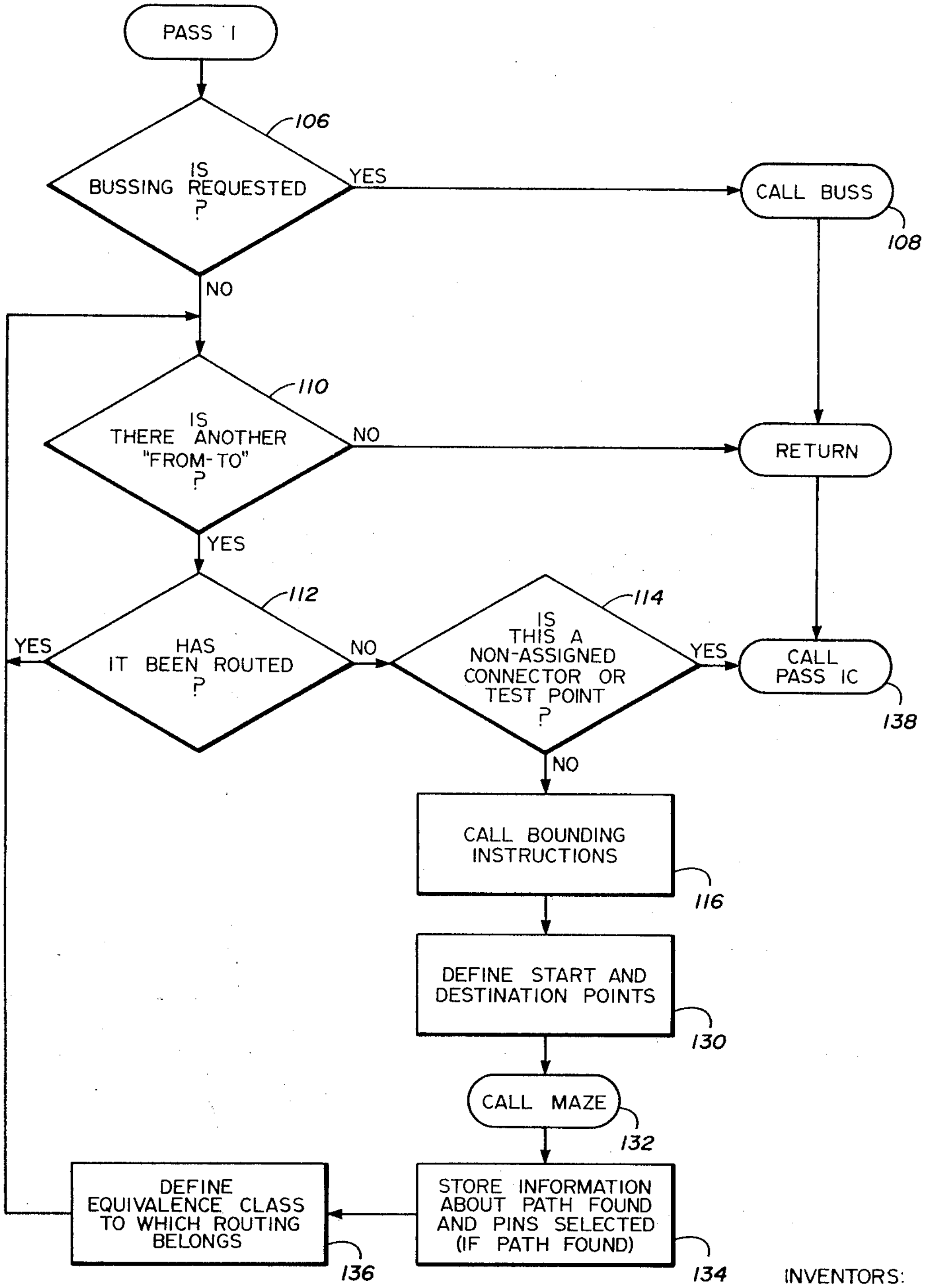
FIG. 7 is a flow chart of a pass one subroutine called by the routing routine of FIG. 6.
Figure 8:
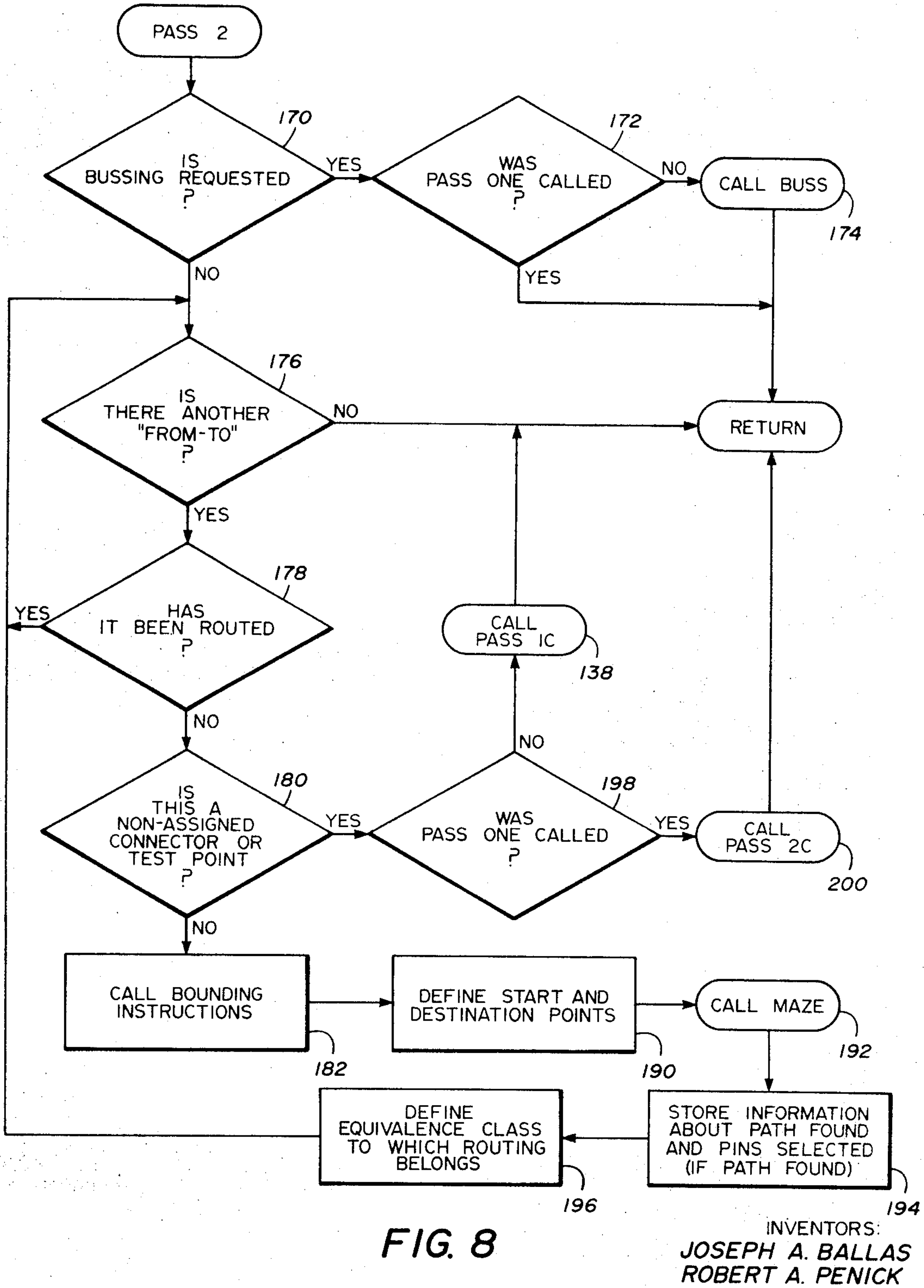
FIG. 8 is a flow chart of a pass two subroutine called by the routing routine of FIG. 6.
Figure 9:
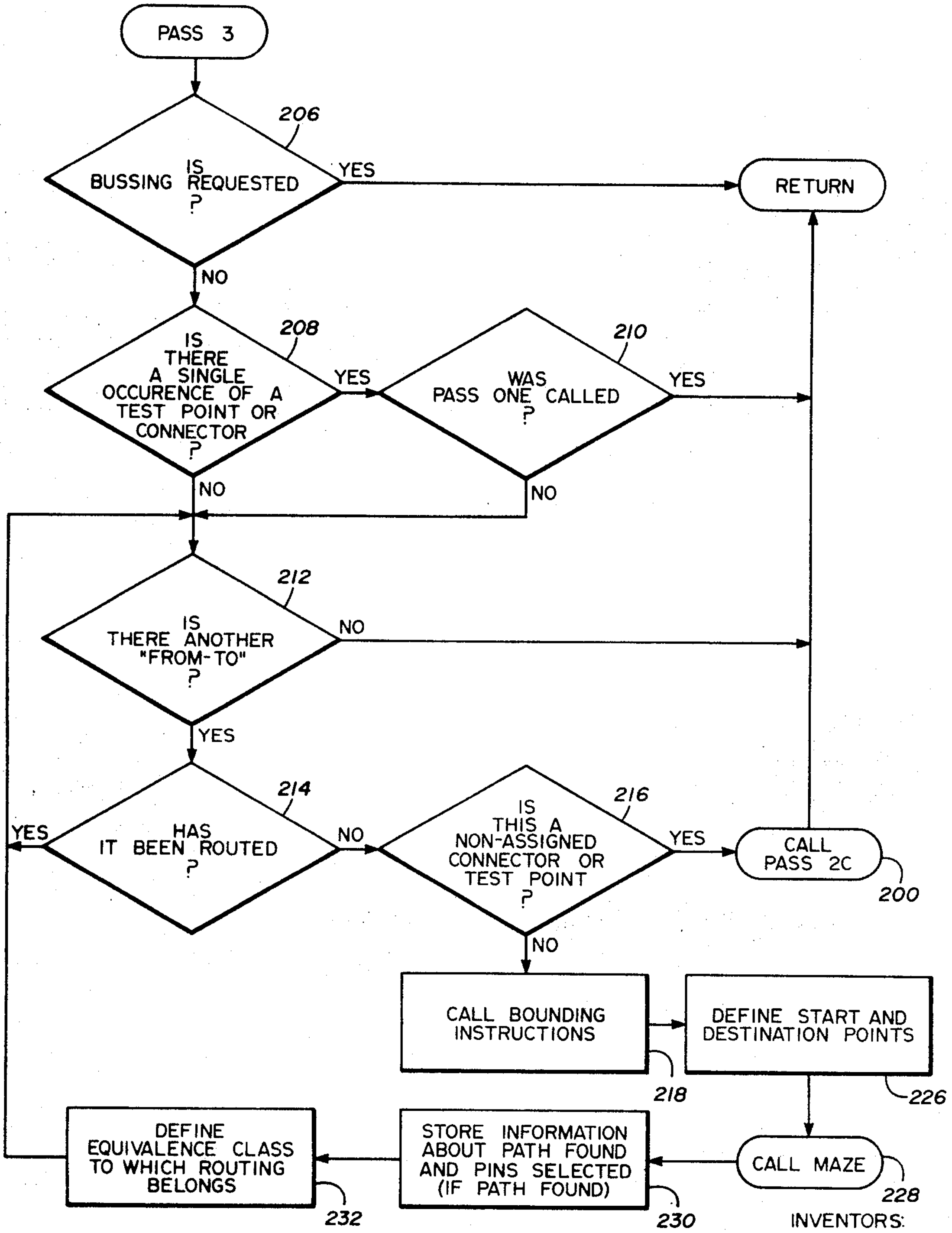
FIG. 9 is a flow chart of a pass three subroutine called by the routing routine of FIG. 6.
Figure 10:
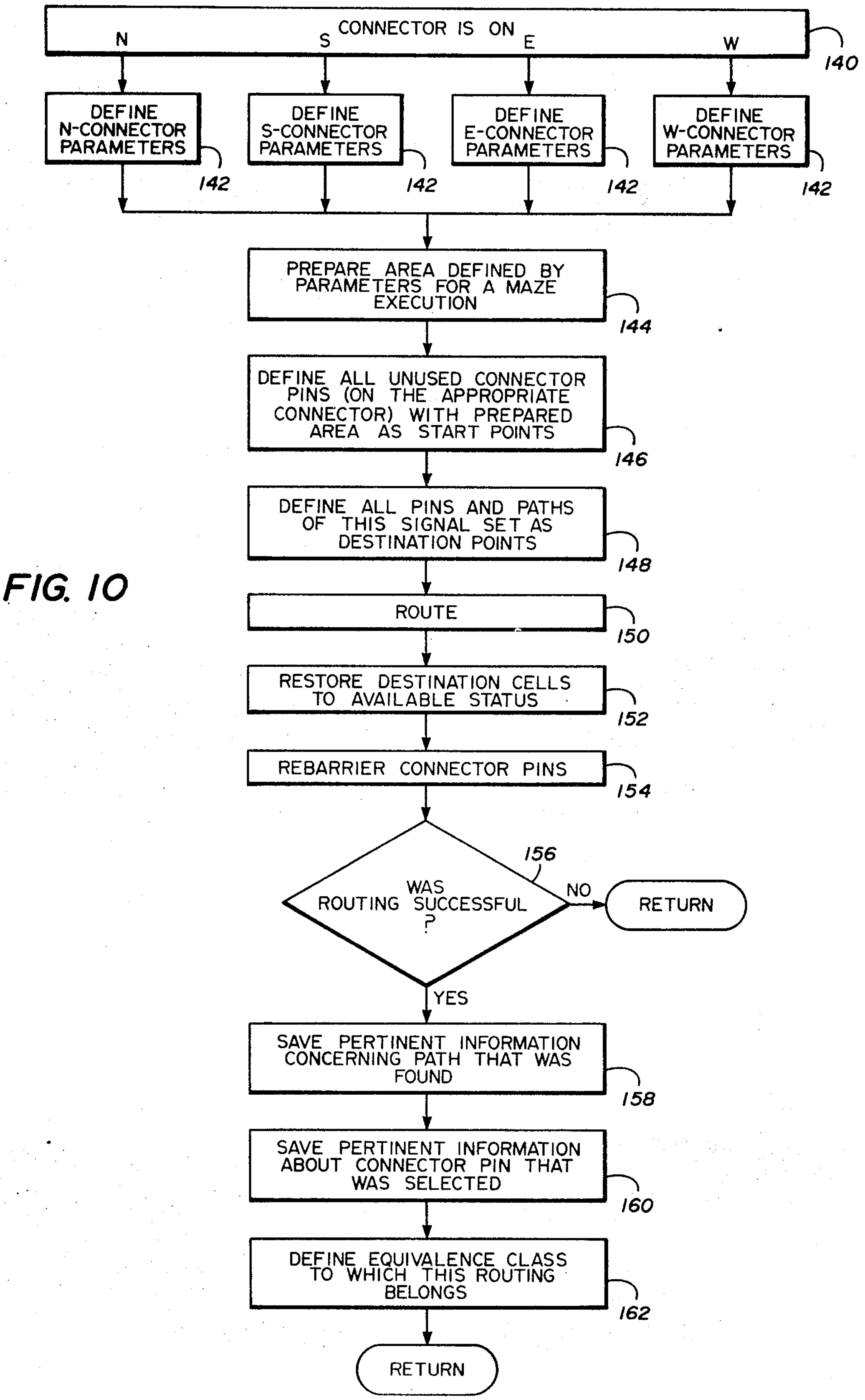
FIG. 10 is a flow chart of a connector subroutine called by the routing routine of FIG. 6.
Figure 11A:
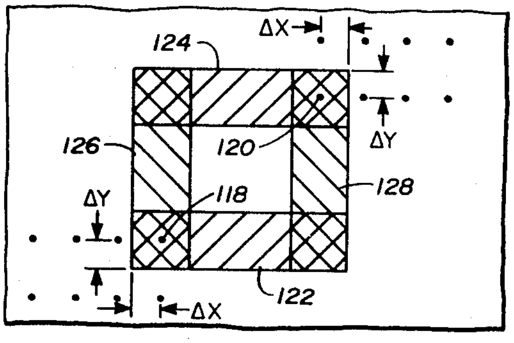
FIGS. 11A, 11B and 11C illustrate bounding limitations for the three subroutines of FIGS. 7, 8 and 9, respectively.
Figure 11B:
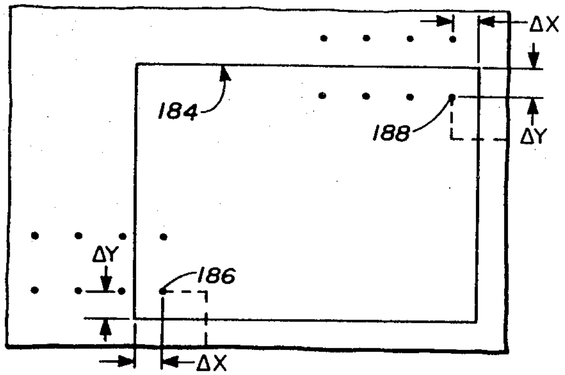
Figure 11C:
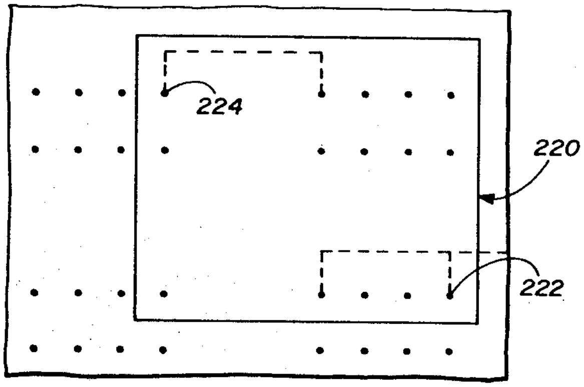
Figure 12:
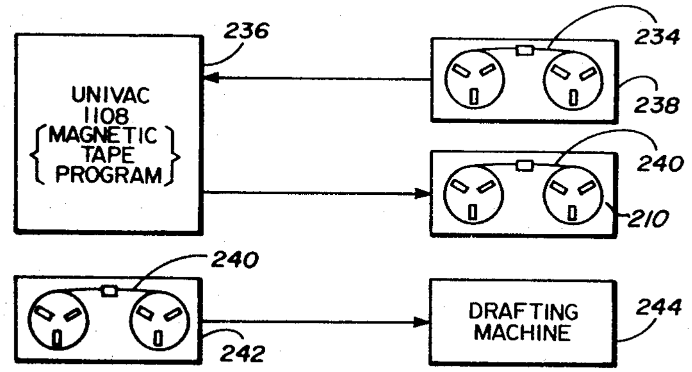
FIG. 12 is a block diagram of a system for generating artwork for a printed circuit board.
Figure 13:
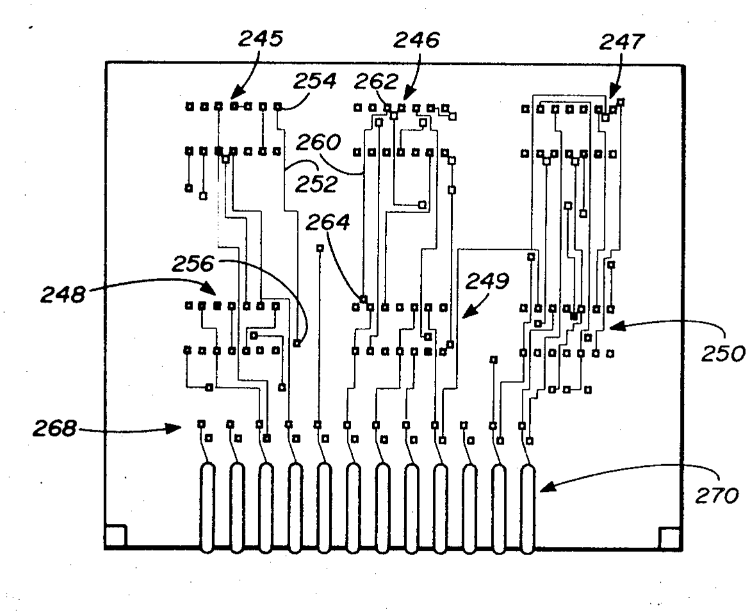
FIG. 13 illustrates the artwork for the top side of a two-sided printed circuit board for the system of FIG. 2.
Figure 14:
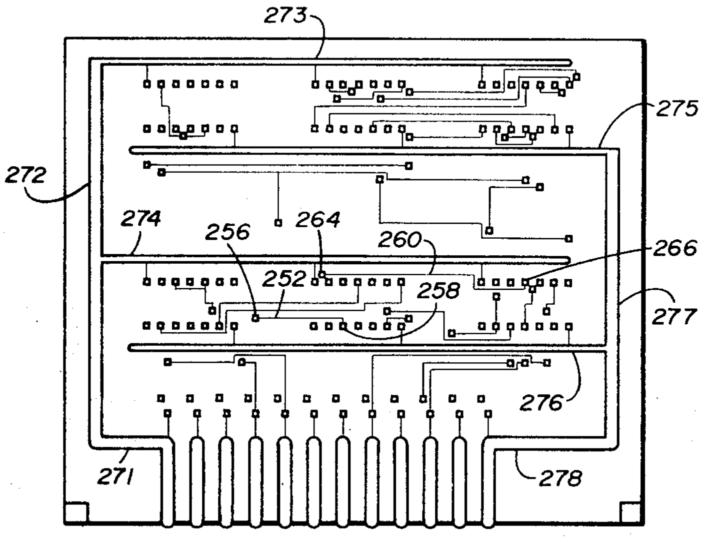
FIG. 14 illustrates the artwork for the bottom side of a two-sided printed circuit board for the logic system of FIG. 2.

For a complete description of our invention including a complete description of FIGS. 1–14, reference is made to U.S. Pat. No. 3,653,072, issued to Joseph A. Ballas and Robert A. Penick on Mar. 28, 1972, and assigned to the assignee of the present invention. The specification of U.S. Pat. No. 3,653,072 is hereby incorporated herein by reference and made a part hereof.

We claim:

1. In a process for producing coded representations of circuit artwork for a desired logic system by a data processing machine from coded input information of such desired logic system wherein the data processing machine generates representations of fixed packages of the logic system elements from the input information, assigns locations to the fixed packages from the input information and from the representations of fixed packages and generates a coded representation of the circuit artwork comprising a representation of interconnections between logic system elements, the steps in the routine for generating representations of fixed packages of the logic system elements comprising:

a. generating a representation of a best package containing logic system elements of one type, from a list of logic system elements to be included in the desired logic system arranged in groups according to logic system element type, in accordance with preselected criteria;

b. generating a representation of a best package containing logic system elements of another type, from said list of logic system elements to be included in the desired logic system, in accordance with said preselected criteria;

c. comparing the representation of the best package containing logic system elements of said one type with the representation of the best package containing logic system elements of said another type in accordance with preselected comparative criteria to select one of the two packages being compared to become a fixed package d. generating a representation of said fixed package; and e. repeating steps (a)–(d) for all of the logic system elements on said list which are not included in a fixed package until all logic system elements on said list have been included in a fixed package and a representation generated thereof.

2. In the process according to claim 1, the step of generating the list of logic system elements to be included in the desired logic system arranged in groups according to logic system element types from the coded input information.

3. In the process according to claim 1, the comparing of representations of best packages in step (c) in accordance with the following ordered set of preselected comparative criteria to select one of the two packages being compared to become a fixed package;

i. selecting the package with the greatest number of connector signatures assigned to a critical designation;

ii. selecting the package having the greatest number of connections to be made to fixed packages when neither of the packages being compared has a critical connector signature or when both of the packages being compared have the same number of critical connector signatures;

iii. selecting the package having the greatest number of fixed signatures when neither of the packages being compared is to be connected to a fixed package or when both packages being compared are to be connected to the same number of fixed packages; and iv. selecting the package having the fewest number of signatures when neither of the packages being compared have fixed signatures or when both of the packages being compared have the same number of fixed signatures.

4. In a process for producing coded representations of circuit artwork for a desired logic system by a data processing machine from coded input information of such desired logic system wherein the data processing machine generates representations of fixed packages of the logic system elements from the input information, assigns locations to the fixed packages from the input information and from the representations of fixed packages and generates a coded representation of the circuit artwork comprising a representation of interconnections between logic system elements, the steps in the routine for generating representations of fixed packages of the logic system elements comprising:

a. generating a representation of a best package containing logic system elements of one type in accordance with preselected criteria from a list of logic system elements to be included in the desired logic system arranged in groups according to logic system element type;

b. generating a representation of a best package containing logic system elements of another type in accordance with said preselected criteria from said list of logic system elements to be included in the desired logic system;

c. comparing the representation of the best package containing logic system elements of said one type with the representation of the best package containing logic system elements of said another type in accordance with preselected comparative criteria to select one of the two packages being compared as the better package of the two packages being compared;

d. generating a representation of a best package containing logic system elements of still another type in accordance with said preselected criteria from said list of logic system elements to be included in the desired logic system;

e. comparing the representation of the better package with the representation of the best package containing logic system elements of said still another type in accordance with said preselected comparative criteria to select one of the two packages being compared to be the better package; and f. generating a representation of a fixed package from the representation of the package selected as the better package from the comparison of step (e).

5. In the process according to claim 4, the repeating of steps (d) and (e) until a best package of logic system elements for each type on said list has been compared before the representation of a fixed package is generated.

6. In the process according to claim 4, the repeating of steps (a)–(f) for all of the logic system elements on said list which are not included in a fixed package until all logic system elements on said list have been included in a fixed package and a representation generated thereof.

7. In the process according to claim 4, the step of generating the list of logic system elements to be included in the desired logic system arranged in groups according to logic system element types from the coded input information.

8. In a process for producing coded representations of circuit artwork for a desired logic system by a data processing machine from coded input information of such desired logic system wherein the data processing machine generates representations of fixed packages of the logic system elements from the input information, assigns locations to the packages from the input information and from the representations of fixed packages and generates a coded representation of the circuit artwork comprising a representation of interconnections between logic system elements, the steps in the routine for generating representations of fixed packages of the logic system elements comprising:

a. generating a representation of a best package containing logic system elements of one type, from a list of logic system elements to be included in the desired logic system arranged in groups according to logic system element type, in accordance with preselected criteria;

b. generating a representation of a best package containing logic system elements of another type, from said list, in accordance with said preselected criteria;

c. comparing the representation of the package containing logic system elements of said one type with the representation of the package containing logic system elements of said another type to select one of the two packages being compared to become a fixed package in accordance with the following ordered set of preselected comparative criteria:

i. selecting the package with the greatest number of connector signatures assigned to a critical designation;

ii. selecting the package having the greatest number of connections to be made to fixed packages when neither of the packages being compared has a critical connector signature or when both of the packages being compared have the same number of critical connector signatures;

iii. selecting the package having the greatest number of fixed signatures when neither of the packages being compared is to be connected to a fixed package or when both packages being compared are to be connected to the same number of fixed packages; and iv. selecting the package having the fewest number of signatures when neither of the packages being compared have fixed signatures or when both of the packages being compared have the same number of fixed signatures; and d. generating a representation of the package selected from the comparison of step (c) as a fixed package.

9. In the process according to claim 8, the repeating of steps (a)–(d) for all of the logic system elements on said list which are not included in a fixed package until all logic system elements on said list have been included in a fixed package and a representation generated thereof.

10. In a process for producing coded representations of circuit artwork for a desired logic system by a data processing machine from coded input information of such desired logic system wherein the data processing machine generates representations of fixed packages of the logic system elements from the input information, assigns locations to the packages from the input information and from representations of the fixed packages and generates a coded representation of the circuit artwork comprising a representation of interconnections between logic system elements, the steps in the routine for generating representations of fixed packages of the logic system elements comprising:

a. generating a list of logic system elements to be included in the desired logic system arranged in groups according to logic system element types from the coded input information;

b. comparing the logic system elements in a first group in accordance with preselected criteria to select a best package containing logic system elements of the desired logic system of the type contained in such first group;

c. generating a representation of a best package containing logic system elements of the type contained in said first group;

d. comparing the logic system elements in a second group in accordance with said preselected criteria to select a best package of logic system elements to be included in the desired logic system of the type contained in such second group;

e. generating a representation of the best package containing logic system elements of the type contained in the second group;

f. comparing the representation of the package containing logic system elements of the type contained in the first group with the representation of the best package containing logic system elements of the type contained in the second group in accordance with preselected comparative criteria to select one of the two packages being compared to be a fixed package; and g. generating a representation of said fixed package.

11. In the process according to claim 10, the repeating of steps (a)–(g) for all of the logic system elements on said list which are not included in a fixed package until all logic system elements on said list which are not included in a fixed package until all logic system elements on said list have been included in a fixed package and a representation generated thereof.

12. In the process according to claim 10, the comparing of logic system elements in step (b), to select a best package containing a logic system element of a type which is individually packaged, according to the following ordered set of preselected criteria:

i. selecting the logic system element from the group under consideration which has the greatest number of connector signatures assigned to critical designations to comprise the best package for such group;

ii. selecting the logic system element from the group under consideration having the greatest number of connections to be made to fixed packages to comprise the best package for such group when none of the logic system elements in such group has a critical connector signature or when all of the elements in such group have the same number of critical connector signatures;

iii. selecting the logic system element from the group under consideration which has the greatest number of fixed signatures to comprise the best package for such group when none of the logic system elements in such group is to be connected to a fixed package or when all of the logic system elements of such group are to be connected to the same number of fixed packages; and iv. selecting the logic system element from the group under consideration which has the fewest number of signatures to comprise the best package for such group when none of the logic system elements of such group have fixed signatures or when all of the logic system elements of such group have the same number of fixed signatures.

13. In the process according to claim 10, the comparing of logic system elements in steps, to select a best package for a group in which all of the logic system elements in such group are of a type which can be contained in a single package, according to the preselected criteria of combining all of the logic system elements in such group into a single package.

14. In the process according to claim 10, the comparing of logic system elements in step (b), to select a first logic system element to comprise a best package containing logic system elements from a group of elements of a type which are not individually packaged and which contains more elements than are to be packaged in a single package, according to the following ordered set of preselected criteria:

i. selecting the logic system element from the group under consideration which has the greatest number of connector signatures assigned to critical designations as the first logic system element to comprise the best package for such group;

ii. selecting the logic system element from the group under consideration having the greatest number of signatures in common with a single input/output connector to be the first logic system element to comprise the best package for such group when none of the logic system elements in such group has a critical connector signature or when all of the elements in such group have the same number of critical connector signatures;

iii. selecting the logic system element from the group under consideration which has the greatest number of signatures in common with a single fixed package as the first logic system element to comprise the best package for such group when none of the logic system elements in such group has signatures in common with a single input/output connector or when all of the logic system elements in such group have the same number of signatures in common with a single input/output connector;

iv. selecting the logic system element from the group under consideration which has the greatest number of signatures in common with a single element of the same type not included in a fixed package as the first logic system element to comprise the best package for such group when none of the logic system elements in such group has signatures in common with a single fixed package or when all of the elements in such group have the same number of signatures in common with a single fixed package;

v. selecting the logic system from the group under consideration which has signatures in common with the greatest number of elements of the same type not included in fixed packages as the first logic system element to comprise the best package for such group when none of the logic system elements in such group has signatures in common with a single element of the same type not included in a fixed package or when all of the elements in such group have the same number of signatures in common with a logic system element of the same type not included in a fixed package; and vi. selecting the logic system element from the group under consideration which has signatures in common with the greatest number of elements of the logic system as the first element to comprise the best package for such group when none of the logic system elements in such group has signatures in common with logic system elements of the same type not included in fixed packages or when all of the logic system elements in such group have signatures in common with the same number of logic system elements of the same type not included in fixed packages.

15. In the process according to claim 14, the comparing of logic system elements, to select additional logic system elements to be combined with the first selected logic system element to comprise the best package including logic system elements from the remaining group of elements of the type which are not individually packaged and which contain more elements than are to be packaged in a single package according to the preselected criteria of selecting logic system elements having common inputs and outputs to be included in the best package for such group.

16. In the process according to claim 14, the comparing of logic system elements, to select additional logic system elements to be combined with the first selected logic system element to comprise a best package including logic system elements from the remaining group of elements of the type which are not individually packaged and which contains more elements than are to be packaged in a single package according to the following ordered set of preselected criteria:

i. selecting the logic system element from the remaining group under consideration which has the greatest number of connector signatures assigned to critical designations to be an additional logic system element to be included in the best package for such group;

ii. selecting the logic system element from the remaining group under consideration having the greatest number of signatures in common with those logic system elements already selected to comprise the best package for such group to be an additional logic system element to be included in the best package for such group when none of the logic system elements remaining in such group has a critical connector signature or when all of the logic system elements remaining in such group have the same number of critical connector signatures;

iii. selecting the logic system element from the remaining group under consideration having the greatest number of signatures in common with a single input/output connector to be an additional logic system element to be included in the best package for such group when none of the logic system elements remaining in such group has signatures in common with the signatures of the portion of the best package selected thus far or when all of the remaining logic system elements have the same number of signatures in common with the signatures of the portion of the best package selected thus far;

iv. selecting a logic system element with signatures in common with the greatest number of elements to which the partially completed package is connected to an additional logic system element to be included in the best package for such group when none of the logic system elements remaining in such group has signatures in common with a single input/output connector or when all the logic system elements remaining in such group have the same number of signatures in common with a single input/output connector; and v. selecting an element that has the greatest number of fixed signatures to be an additional logic system element to be included in the best package for such group when none of the logic system elements remaining in such group has signatures in common with the greatest number of elements to which the partially completed package is connected or when all of the logic system elements remaining in such group have signatures in common with the same number of elements to which the partially completed package is connected.

17. In the process according to claim 16, the repeating of steps (b) in accordance with the preselected criteria of claim 16 until a complete best package for the group under consideration has been selected.

18. In the process according to claim 16, the repeating of step (c) in accordance with the preselected criteria of claim 16 until a complete best package for the group under consideration has been selected.

19. In the process according to claim 10, the comparing of logic system elements in step (d), to select a best package containing a logic system element of a type which is individually packaged, according to the following ordered set of preselected criteria:

i. selecting the logic system element from the group under consideration which has the greatest number of connector signatures assigned to critical designations to comprise the best package for such group;

ii. selecting the logic system element from the group under consideration having the greatest number of connections to be made to fixed packages to comprise the best package for such group when none of the logic system elements in such group has a critical connector signature or when all of the elements in such group have the same number of critical connector signatures;

iii. selecting the logic system element from the group under consideration which has the greatest number of fixed signatures to comprise the best package for such group when none of the logic system elements in such group is to be connected to a fixed package or when all of the logic system elements of such group are to be connected to the same number of fixed packages; and iv. selecting the logic system element from the group under consideration which has the fewest number of signatures to comprise the best package for such group when none of the logic system elements of such group have fixed signatures or when all of the logic system elements of such group have the same number of fixed signatures.

20. In the process according to claim 10, the comparing of logic system elements in step (d), to select a best package for a group in which all of the logic system elements in such group are of a type which can be contained in a single package, according to the preselected criteria of combining all of the logic system elements in such group into a single package.

21. In the process according to claim 10, the comparing of logic system elements in step (d), to select a first logic system element to comprise a best package containing logic system element from a group of elements of a type which are not individually packaged and which contains more elements than are to be packaged in a single package, according to the following ordered set of preselected criteria:

i. selecting the logic system element from the group under consideration which has the greatest number of connector signatures assigned to critical designations as the first logic system element to comprise the best package for such group;

ii. selecting the logic system element from the group under consideration having the greatest number of signatures in common with a single input/output connector to be the first logic system element to comprise the best package for such group when none of the logic system elements in such group has a critical connector signature or when all of the elements in such group have the same number of critical connector signatures;

iii. selecting the logic system element from the group under consideration which has the greatest number of signatures in common with a single fixed package as the first logic system element to comprise the best package for such group when none of the logic system elements in such group has signatures in common with a single input/output connector or when all of the logic system elements in such group have the same number of signatures in common with a single input/output connector;

iv. selecting the logic system element from the group under consideration which has the greatest number of signatures in common with a single element of the same type not included in a fixed package as the first logic system element to comprise the best package for such group when none of the logic system elements in such group has signatures in common with a single fixed package or when all of the elements in such group have the same number of signatures in common with a single fixed package;

v. selecting the logic system from the group under consideration which has signatures in common with the greatest number of elements of the same type not included in fixed packages as the first logic system element to comprise the best package for such group when none of the logic system elements in such group has signatures in common with a single element of the same type not included in a fixed package or when all of the elements in such group have the same number of signatures in common with a logic system element of the same type not included in a fixed package; and vi. selecting the logic system element from the group under consideration which has signatures in common with the greatest number of elements of the logic system as the first element to comprise the best package for such group when none of the logic system elements in such group has signatures in common with logic system elements of the same type not included in fixed packages or when all of the logic system elements in such group have signatures in common with the same number of logic system elements of the same type not included in fixed packages.

22. In the process according to claim 21, the comparing of logic system elements, to select additional logic system elements to be combined with the first selected logic system element to comprise the best package including logic system elements from the remaining group of elements of the type which are not individually packaged and which contain more elements than are to be packaged in a single package according to the preselected criteria of selecting logic system elements having common inputs and outputs to be included in the best package for such group.

23. In the process according to claim 21, the comparing of logic system elements, to select additional logic system elements to be combined with the first selected logic system element to comprise a best package including logic system elements from the remaining group of elements of the type which are not individually packaged and which contains more elements that are to be packaged in a single package according to the following ordered set of preselected criteria:

i. selecting the logic system element from the remaining group under consideration which has the greatest number of connector signatures assigned to critical designations to be an additional logic system element to be included in the best package for such group;

ii. selecting the logic system element from the remaining group under consideration having the greatest number of signatures in common with those logic system elements already selected to comprise the best package for such group to be an additional logic system element to be included in the best package for such group when none of the logic system elements remaining in such group has a critical connector signature or when all of the logic system elements remaining in such group have the same number of critical connector signatures;

iii. selecting the logic system element from the remaining group under consideration having the greatest number of signatures in common with a single input/output connector to be an additional logic system element to be included in the best package for such group when none of the logic system elements remaining in such group has signatures in common with the signatures of the portion of the best package selected thus far or when all of the remaining logic system elements have the same number of signatures in common with the signatures of the portion of the best package selected thus far;

iv. selecting a logic system element with signatures in common with the greatest number of elements to which the partially completed package is connected to an additional logic system element to be included in the best package for such group when none of the logic system elements remaining in such group has signatures in common with a single input/output connector or when all the logic system elements remaining in such group have the same number of signatures in common with a single input/output connector; and v. selecting an element that has the greatest number of fixed signatures to be an additional logic system element to be included in the best package for such group when none of the logic system elements remaining in such group has signatures in common with the greatest number of elements to which the partially completed package is connected or when all of the logic system elements remaining in such group have signatures in common with the same number of elements to which the partially completed package is connected.

24. In the process according to claim 23, the repeating of step (b) in accordance with the preselected criteria of claim 23 until a complete best package for the group under consideration has been selected.

25. In the process according to claim 23, the repeating of step (c) in accordance with the preselected criteria of claim 23 until a complete best package for the group under consideration has been selected.

26. In a process for producing coded representations of circuit art work for a desired logic system by a data processing machine from coded input information of such desired logic system wherein the data processing machine generates representations of fixed packages of the logic system elements from the input information, assigns locations to the packages from the input information and from representations of the fixed packages and generates a coded representation of the circuit art work comprising a representation of interconnections between logic system elements, steps in the routine for generating representations of fixed packages of the logic system elements comprising:

a. generating a list of logic system elements to be included in the desired logic system arranged in groups according to logic system element types from the coded input information;

b. comparing the logic system elements in a first group in accordance with preselected criteria to select a best package containing logic system elements of the desired logic system of the type comprising such first group;

c. generating a representation of the best package containing logic system elements of the type comprising said first group selected during the comparison of step (b);

d. comparing the logic system elements in a second group in accordance with said preselected criteria to select a best package of logic system elements to be included in the desired logic system of the type comprising such second group;

e. generating a representation of the best package containing logic system elements of the type comprising the second group selected during the comparison of step (d);

f. comparing the representation of the package containing logic system elements of the type comprising the first group with the representation of the best package containing logic system elements of the type comprising the second group in accordance with preselected comparative criteria to select one of the two packages being compared as the better package of the two packages being compared;

g. comparing the logic system elements in another group in accordance with said preselected criteria to select a best package of logic system elements to be included in a desired logic system of a type comprising said another group;

h. generating a representation of the best package containing logic system elements of the type comprising said another group selected during the comparison of step (g);

i. comparing the representation of the better package with the representation of the best package containing logic system elements of said another group in accordance with said preselected comparative criteria to select one of the two packages being compared to be the better package;

j. repeating steps (g) through (h) for the remaining groups until a best package of logic system elements for such remaining group of logic system elements on said list has been compared to a better package and a best package for all groups selected;

k. generating a representation of a fixed package of the package selected as the best package of all groups; and l. repeating steps (a) through (k) for all of the logic system elements on said list which are not included in fixed packages until all logic system elements on said list have been included in fixed packages and representations generated thereof.

* * * * *